Aug. 14, 1934.　　　　L. G. SIMJIAN　　　　1,969,909
MOTION PICTURE MOVING SCREEN
Filed Aug. 19, 1931　　　2 Sheets-Sheet 1
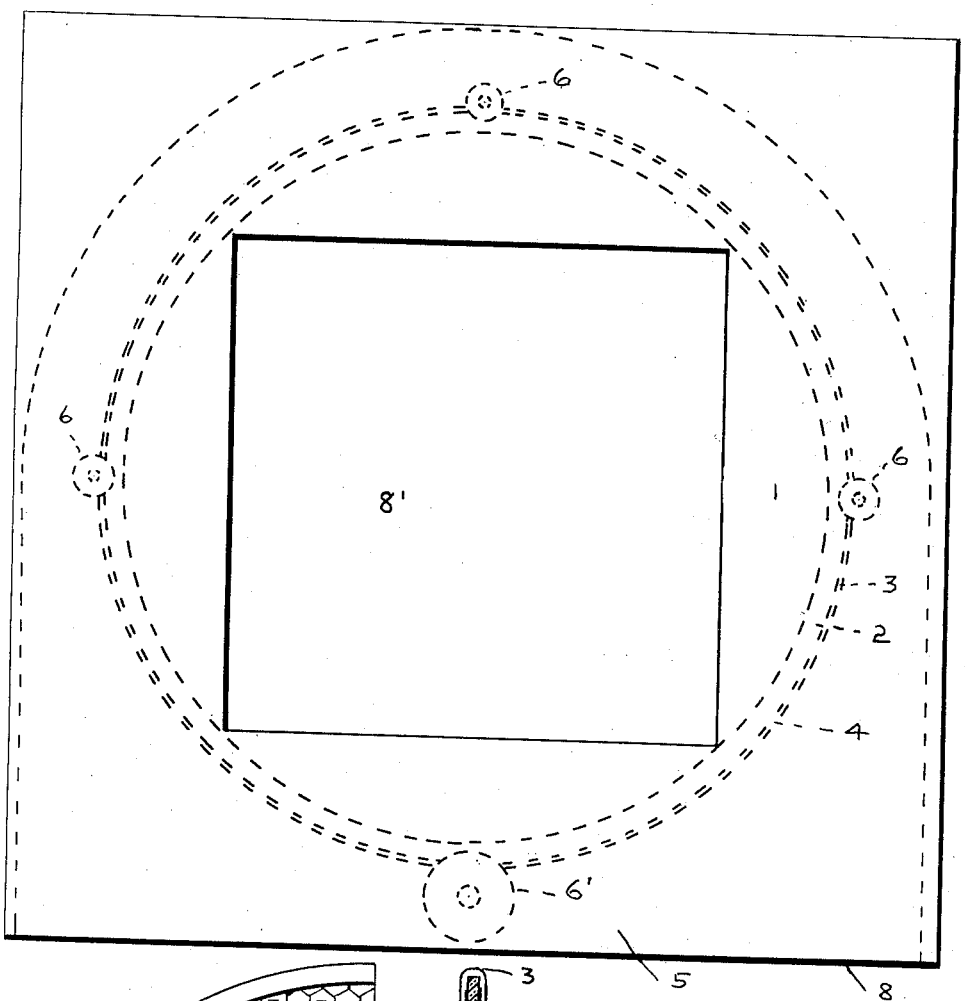
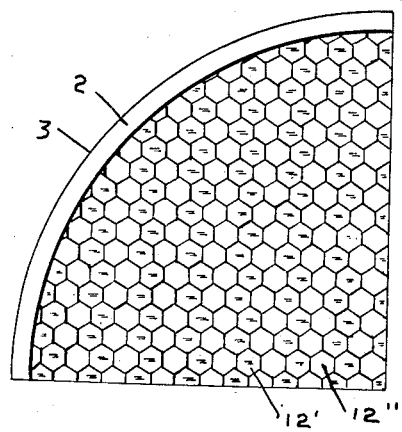
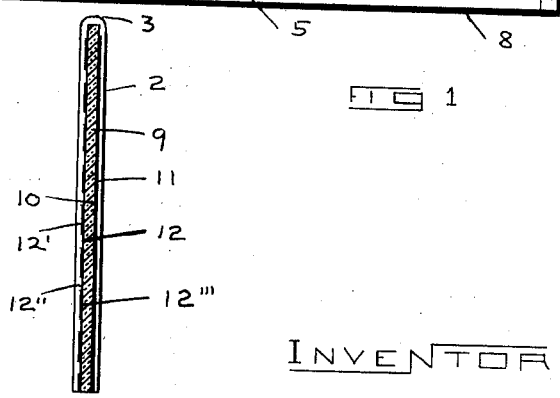
FIG 1
FIG 3　　　FIG 4
INVENTOR
LUTHER G. SIMJIAN
by
George A. Elwell
ATTY Aug. 14, 1934.                L. G. SIMJIAN                1,969,909
                        MOTION PICTURE MOVING SCREEN
                          Filed Aug. 19, 1931          2 Sheets-Sheet 2
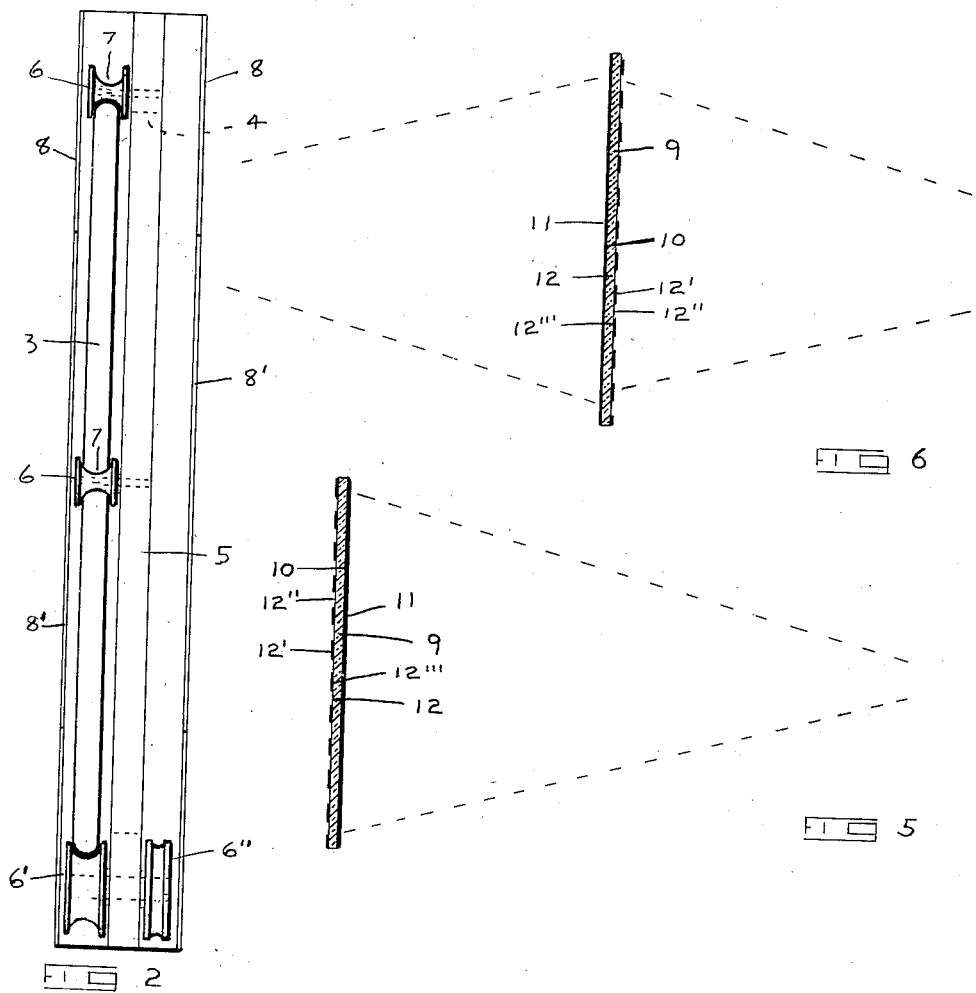
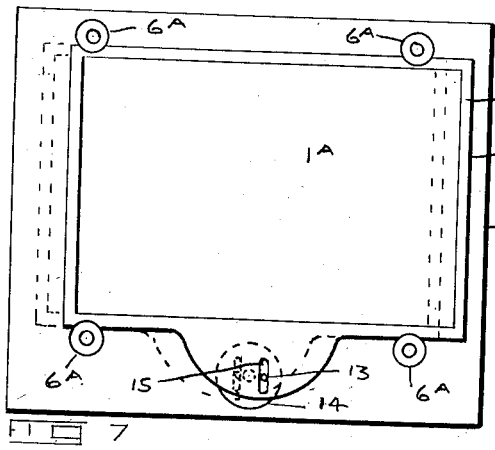
INVENTOR
LUTHER G. SIMJIAN
by George H. Elwell
ATTY Patented Aug. 14, 1934

1,969,909

UNITED STATES PATENT OFFICE 1,969,909

MOTION PICTURE MOVING SCREEN

Luther G. Simjian, New Haven, Conn.

Application August 19, 1931, Serial No. 558,044

5 Claims. (Cl. 88—24)

This invention relates to improvements in motion picture moving screens adapted to intercept light rays focused thereon from a projecting machine, such as the stereopticon or the motion picture machine.

It is old in the art to provide a moving screen having one face upon which a picture may be projected, but the improvement herein about to be disclosed provides, in part, a moving screen having oppositely positioned display faces for purposes to be later explained. One of the objects therefore of this invention is to provide a moving motion-picture screen of a diaphanous body structure having specially prepared forward and rearward faces thereof. Further objects of the invention being to provide the surface of the forward face of the moving screen with a translucent finish, and to closely distribute over the surface of the opposite face forwardly facing light-reflecting deposits; to provide a suitable support having movable bearings engaged by marginal portions of the moving screen; and to provide shields for the faces of the mounted screen to conceal from view the moving bearings and a marginal portion of the moving screen. With these and other objects in view as may become apparent from the within disclosures, the invention consists not only of the particular form herein pointed out and illustrated by the drawings but readily admits of certain modification within the scope of what hereinafter may be claimed.

The character of the improvement may be best understood by reference to one illustrative device embodying the invention and illustrated by the several figures in the accompanying drawings in which the Figure 1 is an upright elevation of a shielded face of a mounted movable screen illustrated in dotted lines; the Figure 2 is an upright side elevation of the device, illustrating shields upon both faces thereof; the Figure 3 is an upright elevation of a fragmentary part of the screen, illustrating a portion of the rear face thereof over which is distributed spaced deposits of forwardly facing light-reflecting spots; the Figure 4 is an upright end view of the fragmentary part shown in the next previous figure and illustrating in cross-section the diaphanous body structure, the translucent finish of one face and the distributed deposits upon the opposite face; the Figure 5 is a diagrammatic representation of the use of the improved screen in intercepting the focused light-rays projected from one direction, but displaying the picture upon both faces of the screen; and the Figure 6 is a diagrammatic representation of another use of the improved screen in intercepting focused light-rays projected from opposite directions; the Figure 7 illustrating a modified form of the improved screen.

Referring more particularly to the drawings, the improved screen 1 is illustrated in circular form and held within a suitable frame 2 the periphery 3 of which has rounded edges, the framed screen being movably mounted adjacent the circular opening 4 of the support 5 by means of the rotatable bearings 6 provided by the support 5, each bearing 6 having a peripheral groove 7 into which the rounded-edged periphery 3 of the frame 2 readily fits, one of the bearings, as at 6', being the medium through which power may be transmitted by means, for instance, of the pulley-wheel 6" upon which a pulley-strap (not illustrated) may be attached. To protect, and conceal from view in either direction, the bearings 6 and a marginal portion of the moving screen, the shields 8 are provided, each being mounted adjacent a face of the screen and each shield disclosing to view only the portion of the screen intended to be illumined as at 8'. The improved screen 1 comprises a diaphanous body structure, as for instance, the glass body structure 9, but may comprise any suitable fabric if specially treated and prepared in any manner that will produce the alternate opaque and translucent spotted screen about to be described. The surface of the forward face 10 of the structure 9 is provided with an application of a fine-textured translucent light-diffusing coating 11 consisting of any of the well-known so-called "ground glass" compounds consisting of:—

| | |
|---|---|
| Sandarac | 90 grains |
| Mastic | 90 grains |
| Ether | 20 grains |
| Benzols | 2 ounces |
| | 1½ ounces |

The surface of the rearward face 12 of the structure 9 is provided with multiple forwardly facing mirrored or light-reflecting spot-like deposits 12' relatively spaced by multiple like spots of uncovered portions 12" of the rearward face 12, the deposits 12' and the uncovered portions 12" preferably being relatively positioned in substantial alternate arcuate or other sequence as regards the movement of the screen 1, the size of each deposit and uncovered portion being exaggerated by the Figure 3 for the purpose of illustration.

In operation, the improved screen 1 is revolved or moved at a sufficient rate of speed, and light-rays, focused thereon by a projecting machine, are intercepted by the forward face 10 of the moving screen 1, as illustrated by the Figure 5. The picture thereby thrown upon the screen 1 is not only displayed upon the forward face 10 in the usual manner, but is also reflected by the multiple mirrored surfaces 12''' of the deposits 12' against the rear surface of the coating 11 and made visible through the multiple uncovered portions 12'' of the diaphanous body 9 as if the picture had been directly focused upon the rearward face 12 of the screen 1, thus making it possible to exhibit at one time the same picture projected by one machine to audiences upon both sides of the screen. This use of the improved screen offers the advantage of building motion picture theatres providing for the seating of an audience upon either side of the improved screen, thus not only increasing the general seating capacity of the theatre but also doubling the most popular seating locations. Another advantage of the improved screen is its use when focused light-rays are projected to throw a picture upon the rearward face 12 of the screen 1, other focused light-rays, as illustrated by the Figure 6, may be projected from the opposite direction upon the forward face 10 of the same screen to throw, in synchronization with the picture, a background of such arranged colors as one desires to add to the picture displayed upon the rearward face 12 of the screen 1 a result otherwise obtainable only by the specific application of deposits of colors to each unit of the picture film. To accomplish this use of the improved screen, the picture is thrown upon the rearward face 12 of the screen 1, the light-rays penetrating the multiple uncovered portions 12' of the diaphanous body structure 9 and displayed upon the rear surface of the translucent coating 11 in the form of a picture visible from the rearward side of the sceen. The light-rays of a second projector machine are then focused upon the forward face 10 of the screen 1 to throw a background of colors synchronized with the picture and reflected upon the rear surface of the translucent coating 11 by means of the multiple mirrored surfaces 12''' of the light-reflecting deposits 12' in registration with the picture shown upon the rearward face 12 of the screen 1.

The Figure 8 illustrates a modified form of the improved screen in that the support 5A and the screen frame 2A are each rectangular in form and, instead of revolving, the screen is reciprocated sidewise by means of an eccentrically carried pin 13 by the rotatable bearing 14, the pin 13 operating within the slot 15 provided by the frame 2A, and the screen being movably held between other bearings 6A as in the preferred form of the device.

I claim:—

1. A screen upon which to project pictures, the screen comprising a diaphanous body member having forward and rearward faces, the forward face having a translucent light-diffusing coating of fine texture applied thereto, and the rearward face having applied thereto multiple forwardly facing light-reflecting spot-like deposits relatively spaced by multiple like spots of uncovered portions of the rearward face.

2. A motion picture moving screen comprising a diaphanous body member having forward and rearward faces, the forward face having a translucent light-diffusing coating of fine texture applied thereto, and the rearward face having applied thereto multiple forwardly facing light-reflecting spot-like deposits relatively spaced by multiple like spots of uncovered portions of the rearward face, the deposits and uncovered portions being relatively positioned in substantial alternate sequence as regards the movement of the screen.

3. A motion picture moving screen comprising a diaphanous body member having forward and rearward faces, the forward face having translucent light-diffusing coating of fine texture applied thereto, and the rearward face having applied thereto multiple forwardly facing light-reflecting spot-like deposits relatively spaced by multiple like spots of uncovered portions of the rearward face, the deposits and the uncovered portions being relatively positioned in substantial alternate sequence as regards the movement of the screen, and marginal shields mounted adjacent said support, one in front of each face, and disclosing to view only the area of the screen intended to be illumined.

4. A motion picture moving screen movably mounted upon a support provided with movable bearings directly engaged by the moving screen, means adapted to move the screen upon the bearings, and a marginal stationary shield member mounted adjacent the support and in front thereof to shield the bearings and a marginal portion of the screen and disclose to view only the area of the screen intended to be illumined.

5. A screen having an area upon which to project pictures, the screen having a diaphanous body structure provided upon one side with a translucent surface and upon the opposite side with multiple opaque light-reflecting portions equally distributed throughout said area, whereby a picture projected upon the said screen is made visible from both sides thereof.

LUTHER G. SIMJIAN.